US011873208B2

(12) United States Patent
Boulay et al.

(10) Patent No.: US 11,873,208 B2
(45) Date of Patent: Jan. 16, 2024

(54) METHOD AND SYSTEM FOR FILLING AN LPG TANK EQUIPPED WITH A SPIT VALVE AND A FILL ASSEMBLY

(71) Applicants: OTODATA WIRELESS NETWORK INC., Montréal (CA); BASE ENGINEERING INC., Saint John (CA)

(72) Inventors: André Boulay, Île-Bizard (CA); Jason Gallovich, Montréal (CA); Philippe Meilleur, Montréal (CA); Stephen Belyea, Darlings Island (CA); Ryan Short, Hampton (CA)

(73) Assignees: OTODATA WIRELESS NETWORK INC., Montreal (CA); BASE ENGINEERING INC., Saint John (CA)

( * ) Notice: Subject to any disclaimer, the term of this patent is extended or adjusted under 35 U.S.C. 154(b) by 0 days.

(21) Appl. No.: 17/314,614

(22) Filed: May 7, 2021

(65) Prior Publication Data

US 2021/0347632 A1 Nov. 11, 2021

Related U.S. Application Data

(60) Provisional application No. 63/021,969, filed on May 8, 2020.

(51) Int. Cl.
*B67D 7/36* (2010.01)
*B67D 7/56* (2010.01)

(52) U.S. Cl.
CPC ............... *B67D 7/362* (2013.01); *B67D 7/56* (2013.01)

(58) Field of Classification Search
CPC ... F17C 5/007; F17C 5/002; F17C 2270/0171
USPC .......................................................... 141/231
See application file for complete search history.

(56) References Cited

U.S. PATENT DOCUMENTS 5,023,806 A * 6/1991 Patel ..................... F17C 13/021 73/317
6,085,805 A * 7/2000 Bates .................... G07F 13/025 141/192
7,295,919 B2 * 11/2007 Humphrey ............ G01F 15/061 702/55
7,441,569 B2 * 10/2008 Lease .................... G01F 23/802 141/192

(Continued)

FOREIGN PATENT DOCUMENTS

EP 0519794 A1 12/1992
EP 2796848 A1 * 10/2014 .......... G01M 3/3263

OTHER PUBLICATIONS

Machine Translation of EP0519794A1 (Year: 2022).*

*Primary Examiner* — Timothy P. Kelly
(74) *Attorney, Agent, or Firm* — Wiggin and Dana LLP

(57) ABSTRACT

A method and a system are disclosed for filling an LPG tank equipped with a spit valve and a fill assembly, the method comprising providing an indication of a level in the LPG tank upon detection of a filling vehicle in a vicinity of the LPG tank, the filling vehicle having a filling hose; initiating a filling of the LPG tank once the filling hose is connected to the fill assembly of the LPG tank; determining when a current level reaches a given level in the LPG tank and stopping the providing of the LPG to the LPG tank once the current level reaches the given level in the LPG tank.

14 Claims, 7 Drawing Sheets

(56) References Cited

U.S. PATENT DOCUMENTS

| | | | | |
|---|---|---|---|---|
| 7,937,216 | B2 * | 5/2011 | Humphrey | G01F 23/80 701/123 |
| 2004/0060368 | A1 * | 4/2004 | Buttler | G01F 15/024 73/861.354 |
| 2016/0292632 | A1 * | 10/2016 | Mashburn | G06Q 30/0635 |
| 2017/0144878 | A1 | 5/2017 | Koeninger et al. | |
| 2021/0334927 | A1 * | 10/2021 | Rojas Calderón | H04W 12/08 |

* cited by examiner

METHOD AND SYSTEM FOR FILLING AN LPG TANK EQUIPPED WITH A SPIT VALVE AND A FILL ASSEMBLY

CROSS-REFERENCE TO RELATED APPLICATIONS

This application claims priority of U.S. Provisional Patent Application No. 63/021,969 entitled "Method and system for filling an LPG tank equipped with a spit valve and a fill assembly" that was filed on May 8, 2020.

FIELD

One or more embodiments of the invention relate to LPG tanks. More precisely, one or more embodiments of the invention relates to a method and a system for filling an LPG tank equipped with a spit valve and a fill assembly.

BACKGROUND

LPG tanks and cylinders are widely used for many applications.

A prior art method for filling an LPG tank using a fuel delivery truck, also referred to as a filling vehicle hereinbelow, comprises attaching a fill hose of the fuel delivery truck to a fill assembly fixed to the tank. An operator of the fuel delivery truck then pumps LPG into the LPG tank using a mechanized pump system located in the fuel delivery truck. The mechanized pump system is operated and controlled by way of interoperability with the propane truck operator on the fuel delivery truck.

It will be appreciated that the fill is stopped following a simple operator visual observation of the overfill valve commonly known as the "spit valve" which is located on the fill assembly. More precisely, the employee will stop the filling only once a steady vapor cloud of LPG is present in the air. The vapor cloud of LPG is caused by a release from the "spit valve" of vapor and liquid propane which quickly flashes into a vapor cloud at temperatures above minus 40 degrees.

As a matter of fact, the operator will then alert and/or control the mechanized pump system using controls located inside the fuel delivery truck which is typically controlled by a BASE Engineering remote.

It will be appreciated by the skilled addressee that the prior art method for filling an LPG tank suffers from many drawbacks.

A first drawback is that this prior art method for filling an LPG tank relies on the "spit valve".

Another drawback of the method for filling an LPG tank is that there a potential for accidental and costly spills of LPG.

There is a need for a method and system that will overcome at least one of the above-identified drawbacks.

Features of the invention will be apparent from review of the disclosure, drawings and description of the invention below.

BRIEF SUMMARY

According to a broad aspect, there is disclosed a method for filling an LPG tank equipped with a spit valve and a fill assembly, the method comprising providing an indication of a level in the LPG tank upon detection of a filling vehicle in a vicinity of the LPG tank, the filling vehicle having a filling hose; initiating a filling of the LPG tank once the filling hose is connected to the fill assembly of the LPG tank; determining when a current level reaches a given level in the LPG tank; and stopping the providing of the LPG to the LPG tank once the current level reaches the given level in the LPG tank.

In accordance with one or more embodiments, a telemetry unit is operatively connected to the LPG tank; further wherein the indication of a level in the LPG tank is provided upon detection of a filling vehicle in a vicinity of the LPG tank using the telemetry unit.

In accordance with one or more embodiments, the filling vehicle is provided with a flow controller; further wherein the initiating of a filing of the LPG tank once the filling hose is connected to the fill assembly of the LPG tank and the stopping of the providing of the LPG to the LPG tank are performed using the flow controller.

In accordance with one or more embodiments, the flow controller is operatively connected to the telemetry unit; further comprising performing an authentication between the telemetry unit and the flow controller.

In accordance with one or more embodiments, the authentication comprises sharing data between the telemetry unit and the flow controller.

In accordance with one or more embodiments, the shared data is selected from a group consisting of an identifier uniquely identifying the LPG tank, an identifier uniquely identifying the filing vehicle, an initial level of the LPG tank, an indication of a capacity of said LPG tank, an optimal filling capacity of the LPG tank, data associated with successful without overflow filling operations.

In accordance with one or more embodiments, the authentication further comprises sharing data between a remote server and at least one of the telemetry unit and the flow controller.

In accordance with one or more embodiments, the method further comprises obtaining a feedback indicative of a successful fill from an operator interacting with the flow controller via a processing unit.

In accordance with one or more embodiments, the given level is associated with the LPG tank.

In accordance with one or more embodiments, the method further comprises determining the given level of the LPG tank.

In accordance with one or more embodiments, the given level of the LPG tank is determined using data associated with at least one previous successful fill.

In accordance with one or more embodiments, the flow controller is capable of controlling an LPG flowrate; further wherein the initiating of the filling of the LPG tank comprises providing the LPG at a given LPG flowrate and amending the LPG flowrate.

In accordance with one or more embodiments, the LPG flowrate is amended once a current level reaches a predefined level.

In accordance with one or more embodiments, the method further comprises stopping the fill upon detection of an input of an operator of the filling vehicle.

According to a broad aspect, there is disclosed a system for filling an LPG tank equipped with a spit valve and a fill assembly, the system comprising a telemetry unit to be installed on an LPG tank, the telemetry unit comprising: a tank level measuring unit for providing an indication of a corresponding tank level of the LPG tank; a proximity sensor for detecting a presence of a corresponding given flow controller in a vicinity of the telemetry unit; a telemetry unit communication unit for communicating with a corresponding given flow controller communicating unit when said given flow controller is in vicinity of the telemetry unit; a memory unit for storing data; and a processing unit operatively connected to the tank level measuring unit, the proximity sensor, the telemetry unit communication unit, and the memory unit; a flow controller installed at a corresponding fuel delivery truck, the flow controller comprising: a proximity sensor for detecting a presence of a corresponding given telemetry unit; a flow actuator for controlling a flow of LPG provided; a flow controller communication unit for communicating with the corresponding given telemetry unit when said corresponding given telemetry unit is in vicinity of the flow controller; a memory unit for storing data; and a processing unit operatively connected to the proximity sensor, to the flow actuator, to the memory, and to the flow controller communication unit; wherein the filling of the LPG tank comprises: obtaining an indication of a level in the LPG tank upon detection of a filling vehicle in a vicinity of the LPG tank using the tank level measuring unit of the telemetry unit, the filling vehicle having a filling hose; initiating a filling of the LPG tank once the filling hose is connected to the fill assembly of the LPG tank using the flow actuator of the flow controller; determining when a current level measured by the tank level measuring unit reaches a given level in the LPG tank using the tank level measuring unit of the telemetry unit; and stopping the providing of the LPG to the LPG tank using the flow actuator of the flow controller once the current level reaches the given level in the LPG tank.

In accordance with one or more embodiments, the flow controller is operatively connected to the telemetry unit using one of a wired and a wireless connection.

In accordance with one or more embodiments, the system further comprises a remote server operatively connected to the telemetry unit and to the flow controller.

One or more embodiments of the method and the system disclosed herein are of great advantage.

In fact, a first advantage of one or more embodiments of the method and the system disclosed above is that they prevent accidental or intentional overfilling of said recipient.

Another advantage of one or more embodiments of the method and the system disclosed above is that they prevent accidental or intentional spilling or venting of harmful liquids and emissions external to said recipient.

BRIEF DESCRIPTION OF THE DRAWINGS

In order that the invention may be readily understood, embodiments of the invention are illustrated by way of example in the accompanying drawings.

FIG. 6*a* is a block diagram which illustrates a wireless connection between a flow controller and a telemetry unit while

Figure 1:
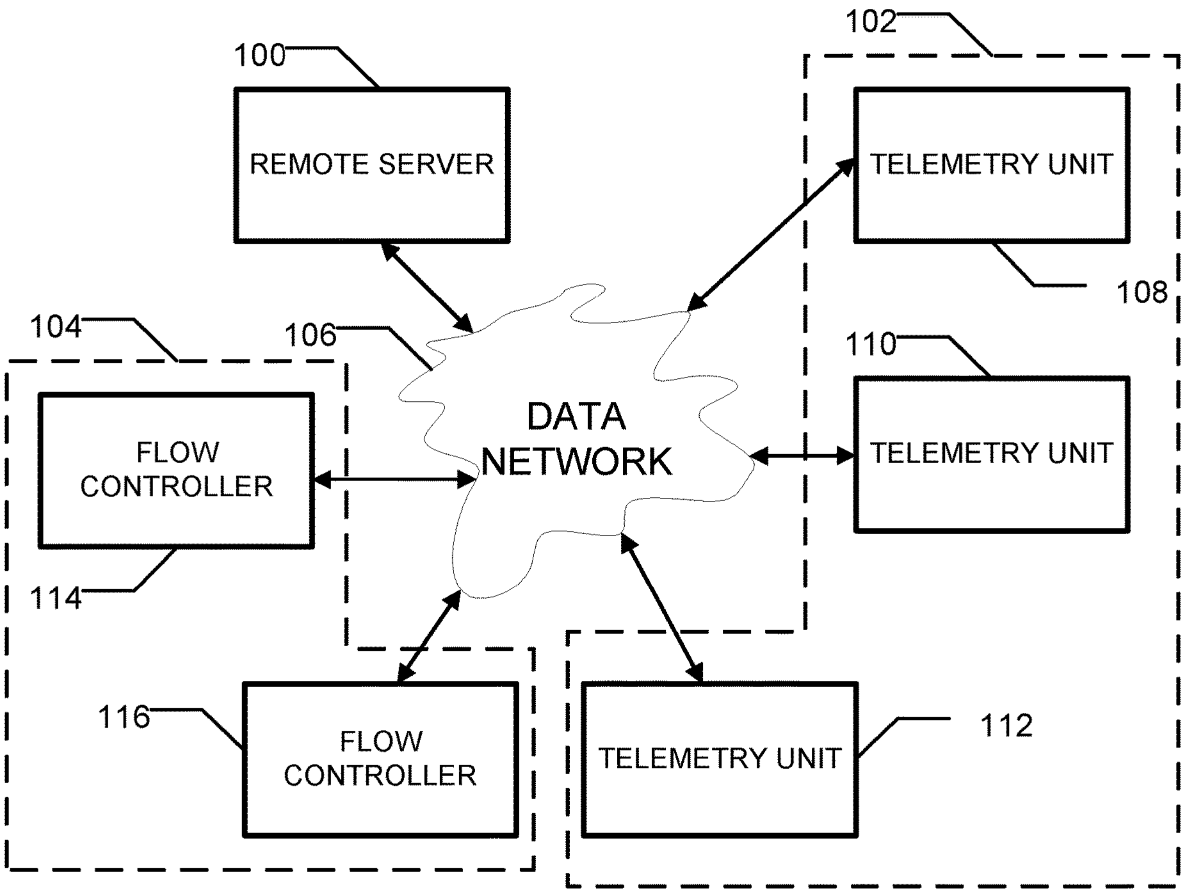
FIG. 1 is a block diagram which shows an embodiment of a system for filling up an LPG tank equipped with a "spit valve" and a fill assembly. The system comprises a plurality of telemetry units, a plurality of flow controllers and a remote server.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, one or more embodiments of the present invention are directed to a method and a system for filling an LPG tank equipped with a spit valve and a fill assembly.

Now referring to FIG. 1, there is shown an embodiment of a system for filling an LPG tank equipped with a "spit valve" and a fill assembly.

In this embodiment, the system comprises an optional remote server 100, a plurality of telemetry units 102, a plurality of flow controllers 104 and a data network 106.

The plurality of telemetry units 102 comprise a telemetry unit 108, a telemetry unit 110 and a telemetry unit 112.

The plurality of flow controllers 104 comprise flow controller 114 and flow controller 116.

In the embodiment disclosed in FIG. 1, each of the telemetry units 108, 110 and 112 of the plurality of telemetry units 102 is operatively connected to the data network 106. It will also be appreciated that in the embodiment disclosed in FIG. 1, each of the flow controllers 114 and 116 of the plurality of flow controllers 104 is operatively connected to the data network 106. It will also be appreciated that the remote server 100 is operatively connected to the data network 106.

In one or more alternative embodiments, one of the plurality of telemetry units 102 and the plurality of flow controllers 104 is operatively connected to the data network 106.

While there has been shown an embodiment where the plurality of telemetry units 102 comprise the telemetry unit 108, the telemetry unit 110 and the telemetry unit 112, it will be appreciated by the skilled addressee that any number of telemetry units may be provided in the plurality of telemetry units 102.

Similarly, while the embodiment disclosed in FIG. 1 shows that the plurality of flow controllers 104 comprise the flow controller 114 and the flow controller 116, it will also be appreciated by the skilled addressee that any number of flow controllers may be provided in the plurality of flow controllers 104.

Each telemetry unit of the plurality of telemetry units 102 is typically installed on an LPG tank and is used inter alia for enabling a filling of the corresponding LPG tank according to one or more embodiments of the method disclosed herein. As further explained below, the filing is performed by interacting inter alia with a corresponding flow controller located in the vicinity of the telemetry unit. For instance, in the embodiment disclosed in FIG. 1, telemetry unit 112 is operatively connected with the flow controller 116. While it will be appreciated that in this embodiment, the telemetry unit 112 is operatively connected with the flow controller 116 via a wireless connection, it will be appreciated that in an alternative embodiment, the telemetry unit 112 is operatively connected with the flow controller 116 via a wired connection.

Each flow controller of the plurality of flow controllers 104 is used for managing the filling of the LPG tank. More precisely, each flow controller is installed at a corresponding fuel delivery truck and is used for managing the pumping of LPG into the LPG tank to which it is operatively connected.

The optional remote server 100 may be used for monitoring and managing the filling operations as further explained below. It will be appreciated that the remote server 100 is optional. Moreover, it will be appreciated that in one or more embodiments wherein a remote server 100 is provided, a connection to the remote server 100 may not be required at all time.

The data network 106 is used for exchanging data between the plurality of telemetry units 102, the plurality of flow controllers 104 and the remote server 100. It will be appreciated that in one or more embodiments wherein the remote server 100 is not provided, a given telemetry unit may communicate directly with a corresponding given flow controller without the data network 106. In such cases, the data network 106 may not be required.

It will be appreciated that the data network 106 may be of various types. In one or more embodiments, the data network 106 is selected from a group consisting of a metropolitan area network (MAN) and a wide area network (WAN). In one or more embodiments, the data network 106 comprises the Internet. It will be appreciated that in the embodiment wherein no remote server 100 is provided, the data network 106 may be comprised of a local area network (LAN) wherein the plurality of telemetry units 102 and the plurality of flow controllers 104 are in point to point BLE communication or are in communication using another point to point communication protocol.

Figure 2:
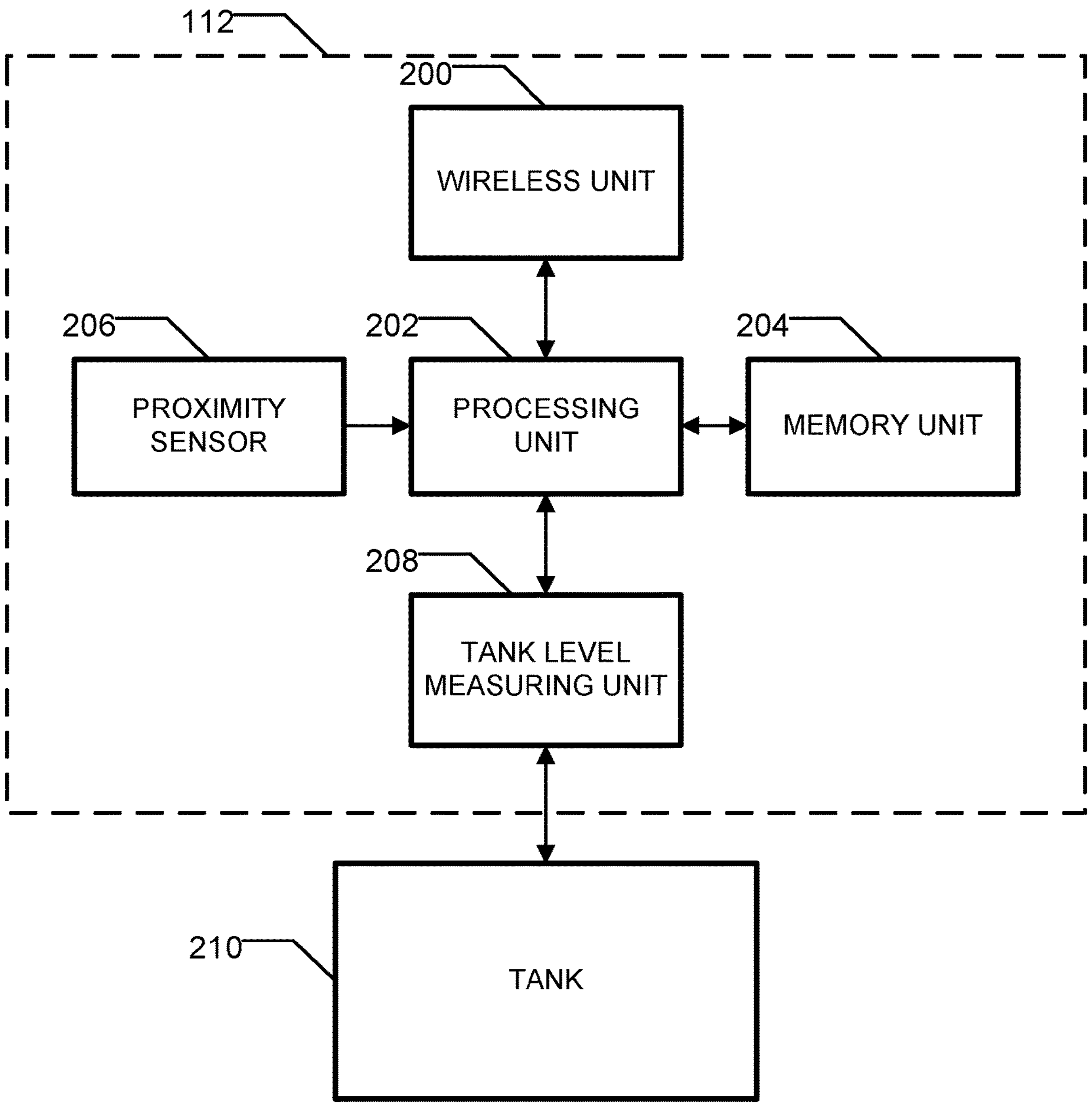
FIG. 2 is a block diagram which shows an embodiment of a telemetry unit.

Now referring to FIG. 2, there is shown an embodiment of the telemetry unit 112. As mentioned above, the telemetry unit 112 is installed on a corresponding LPG tank 210.

More precisely and as shown in FIG. 2, the telemetry unit 112 comprises a wireless unit 200, a processing unit 202, a memory unit 204, a proximity sensor 206, and a tank level measuring unit 208.

The wireless unit 200 is operatively connected to the processing unit 202. The memory unit 204 is operatively connected to the processing unit 202. The tank level measuring unit 208 is operatively connected to the processing unit 202. Finally, the proximity sensor 206 is operatively connected to the processing unit 202.

As illustrated in FIG. 2, the tank level measuring unit 208 is operatively connected to the LPG tank 210 and is used for measuring and providing a corresponding tank level of the LPG tank 210.

It will be appreciated that the wireless unit 200 is used for enabling the telemetry unit 112 to exchange data wirelessly with a corresponding flow controller 116 located in the vicinity of the telemetry unit 112. The skilled addressee will appreciate that such wireless unit 200 is required if the connection between the telemetry unit 112 and the corresponding flow controller 116 is wireless. In one or more embodiments where the connection between the telemetry unit 112 and the corresponding flow controller 116 is wired no such wireless unit is required. The wireless unit 200 may be further used for optionally enabling the telemetry unit 112 to exchange data optionally with the remote server 100 via the data network 106, as illustrated in FIG. 1.

It will be appreciated that the wireless unit 200 may be of various types. In fact, it will be appreciated that the wireless unit 200 may comprise various interfaces. For instance and in order to enable a communication with the flow controller 116, a short range communication interface may be used. The short range communication interface may be based on various technologies such as Bluetooth, IEEE 802.11 (Wifi), Near field communication (NFC), ultra-wideband (UWB), ZigBee, Zwave, ANT, 6LoPAN, a proprietary 433 MHz, 900 MHz, 2.4 GHz, any ISM, public or private band communication protocol, infra-red or the like. The skilled addressee will appreciate that in order to enable an optional communication with the remote server 100, a specific communication interface may be used depending on the data network 106. For instance, such communication interface may be based on various technologies such as IEEE 802.11 (WIFI), GSM, UMTS, Long range (LoRa), Sigfox, SPRS, NB-IoT, Cat-M, CDMA 2000, LTE, 5G or the like. The skilled addressee will therefore appreciate that various embodiments may be possible for the wireless unit 200.

In one or more embodiments, the wireless unit 200 is a TM6030 or any other telemetry monitor manufactured by Otodata Wireless Network. The skilled addressee will appreciate that various alternative embodiments may be provided for the wireless unit 200.

The proximity sensor 206 is used for detecting a presence of corresponding flow controller in the vicinity of the telemetry unit 112. In this specific embodiment, the proximity sensor 206 is used for detecting the presence of the flow controller 116. It will be appreciated by the skilled addressee that the proximity sensor 206 may be operating according to various technologies. In particular, it will be appreciated that in one embodiment the proximity sensor 206 is integrated with the wireless unit 200. In one embodiment, the proximity sensor 206, is based on Bluetooth technology. In such embodiment, the proximity is detected by analyzing signal strength of advertising packets and determining whenever two corresponding proximity sensors detects a certain threshold of RF radiated power. The skilled addressee will appreciate that various alternative embodiments may be provided for the proximity sensor 206. The skilled addressee will appreciate that such proximity sensor 206 is required if the connection between the telemetry unit 112 and the corresponding flow controller 116 is wireless. In the embodiment where the connection between the telemetry unit 112 and the corresponding flow controller 116 is wired no such proximity sensor 206 is required.

The memory unit 204 is used for storing data. It will be appreciated that the memory unit 204 may be of various types and sizes as known to the skilled addressee. In one or more embodiments, the memory unit 204 is embedded with the processing unit 202. In one or more embodiments, nRF52832 manufactured by Nordic Semiconductor is used. The skilled addressee will appreciate that various alternative embodiments may be possible for the memory unit 204.

The tank level measuring unit 208 is used for providing an indication of a current level in the LPG tank 210. It will be appreciated that the tank level measuring level may operate according to various technologies. In one or more embodiments, the tank level measuring unit 208 operates according to Hall effect technology and is manufactured by Rochester. As a matter of fact, it will be appreciated that an angular position reflecting actual tank level through a float mechanism is read using Hall effect detector and is then mapped according to a tank type. It will be appreciated that sensors using various other technologies, such as for instance and in a non-limiting example, ultrasonic-based technology may be used. The skilled addressee will therefore appreciate that various alternative embodiments may be provided for the tank level measuring unit 208.

The processing unit 202 is used for processing data and is operatively connected to the wireless unit 200, the proximity sensor 206, the memory unit 204 and the tank level measuring unit 208. It will be appreciated that various embodiments may be provided for the processing unit 202. In one or more embodiments and as mentioned above, the processing unit 202 is a microcontroller nRF52832 and is manufactured by Nordic Semiconductor.

It will be appreciated that the wireless unit 200, the proximity sensor 206, the memory unit 204, the processing unit 202 and the tank level measuring unit 208 may be integrated together according to various embodiments. The skilled addressee will appreciate that the integration takes into consideration that the LPG tank 210 is likely located outdoor and that outdoor condition are taken into consideration for that purpose. Also while this has not been disclosed, the skilled addressee will appreciate that the telemetry unit 112 is provided with a power unit suitable for providing power accordingly. In one or more embodiment, the power unit comprises a battery.

While one embodiment has been disclosed in FIG. 2, it will be appreciated by the skilled addressee that various alternative embodiments may be provided for the telemetry unit 112.

Figure 3A:
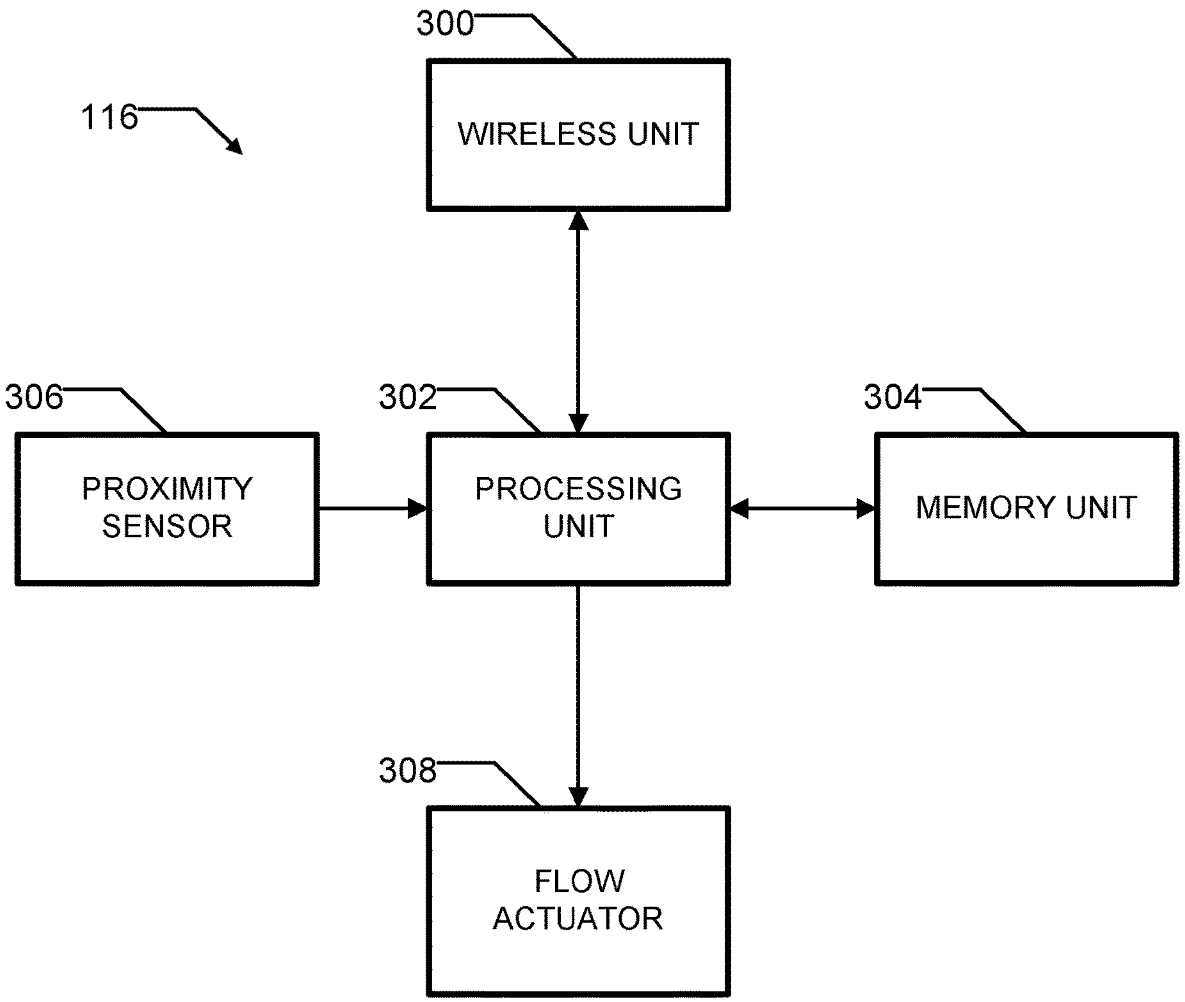
FIG. 3*a* is a block diagram which shows a first embodiment of a flow controller.

Now referring to FIG. 3*a*, there is shown a first embodiment of the flow controller 116. It will be appreciated that the flow controller 116 is operatively connected to the telemetry unit 112 located in the vicinity thereof, as illustrated in FIG. 1.

As mentioned above, the flow controller 116 is installed at a corresponding fuel delivery truck and is used for managing the pumping of LPG into the LPG tank to which the fuel delivery truck is operatively connected to.

In this embodiment, the flow controller 116 comprises a wireless unit 300, a processing unit 302, a memory unit 304, a proximity sensor 306, and a flow actuator 308.

The wireless unit 300 is operatively connected to the processing unit 302. The memory unit 304 is operatively connected to the processing unit 302 and the processing unit 302 is operatively connected to the flow actuator 308. It will also be appreciated that the proximity sensor 306 is operatively connected to the processing unit 302.

More precisely, the wireless unit 300 is used for enabling a communication between the flow controller 116 and the telemetry unit 112 located in the vicinity of the flow controller 116. It will also be appreciated that the wireless unit 300 may be optionally used for enabling a communication between the flow controller 116 and the remote server 100, not shown. As mentioned above, in the embodiment wherein the telemetry unit 112 is operatively connected to the flow controller 116 using a wired connection, the wireless unit 300 may be optional.

It will be appreciated that the wireless unit 300 may be of various types. In fact, it will be appreciated that the wireless unit 300 may comprise various interfaces. For instance and in order to enable a communication with the telemetry unit 112, a short range communication interface may be used. The short range communication interface may be based on various technologies such as Bluetooth, IEEE 802.11 (WIFI), Near field communication (NFC), ultra-wideband (UWB), ZigBee, Zwave, ANT, 6LoPAN, a proprietary 433 MHz, 900 MHz, 2.4 GHz, any ISM, public or private band communication protocol, infra-red or the like. The skilled addressee will appreciate that in order to enable an optional communication with the remote server 100, a specific communication interface may be used depending on the data network 106. For instance, such communication interface may be based on various technologies such as IEEE 802.11 (WIFI), GSM, UMTS, Long range (LoRa), Sigfox, SPRS, NB-IoT, Cat-M, CDMA 2000, LTE, 5G or the like. The skilled addressee will therefore appreciate that various embodiments may be possible for the wireless unit 300.

In one or more embodiments, the wireless unit 300 is manufactured by BASE Engineering Inc of Saint John, New Brunswick, Canada. The skilled addressee will appreciate that various alternative embodiments may be provided for the wireless unit 300.

The proximity sensor 306 is used for detecting a presence of a corresponding telemetry unit in the vicinity of the flow controller 116. In this specific embodiment, the proximity sensor 306 is used for detecting the presence of the telemetry unit 112. It will be appreciated by the skilled addressee that the proximity sensor 306 may be operating according to various technologies. In particular, it will be appreciated that in one or more embodiments the proximity sensor 306 is integrated with the wireless unit 300. In one or more embodiments, the proximity sensor 306 is based on Bluetooth technology. In such embodiments, proximity is detected by analyzing signal strength of advertising packets and determining whenever two corresponding proximity sensors detects a certain threshold of RF radiated power. The skilled addressee will appreciate that various alternative embodiments may be provided for the proximity sensor 306. As mentioned above, in the one or more embodiments wherein the telemetry unit 112 is operatively connected to the flow controller 116 using a wired connection, the proximity sensor 306 may be optional.

The flow actuator 308 is used for controlling a flow of LPG provided. In one or more embodiments, the flow actuator 308 is used for actuating a pump used for filling an LPG tank 210 on which the telemetry unit 112 is installed and to which the fuel delivery truck is operatively connected to. In one or more other embodiments, the flow actuator 308 is interfaced to an in-line valve which will start, stop or regulate the flow of propane provided. It will be appreciated that the flow actuator 308 may be of various types as will appreciate the skilled addressee. In particular and in one embodiment, the flow actuator 308 comprises a PTO. In another embodiment, the flow actuator 308 is interfaced to the electronically controlled flow control valve VersaFill which is manufactured by BASE Engineering Inc of Saint John, New Brunswick, Canada.

The processing unit 302 is used for processing data and is operatively connected to the wireless unit 300, the proximity sensor 306, the memory unit 304 and the flow actuator 308. It will be appreciated that various embodiments may be provided for the processing unit 302. In one or more embodiments, the processing unit 302 is PIC32MZ2048EFM144 and is manufactured by Microchip.

The memory unit 304 is used for storing data. It will be appreciated that at least one portion of the data may be provided by the processing unit 302. It will be appreciated by the skilled addressee that various embodiments may be provided for the memory unit 304. In one or more embodiments, the memory unit 304 is a FLASH memory embedded with the processing unit 302. The skilled addressee will appreciate that various alternative embodiments may be provided for the memory unit 304.

Figure 3B:
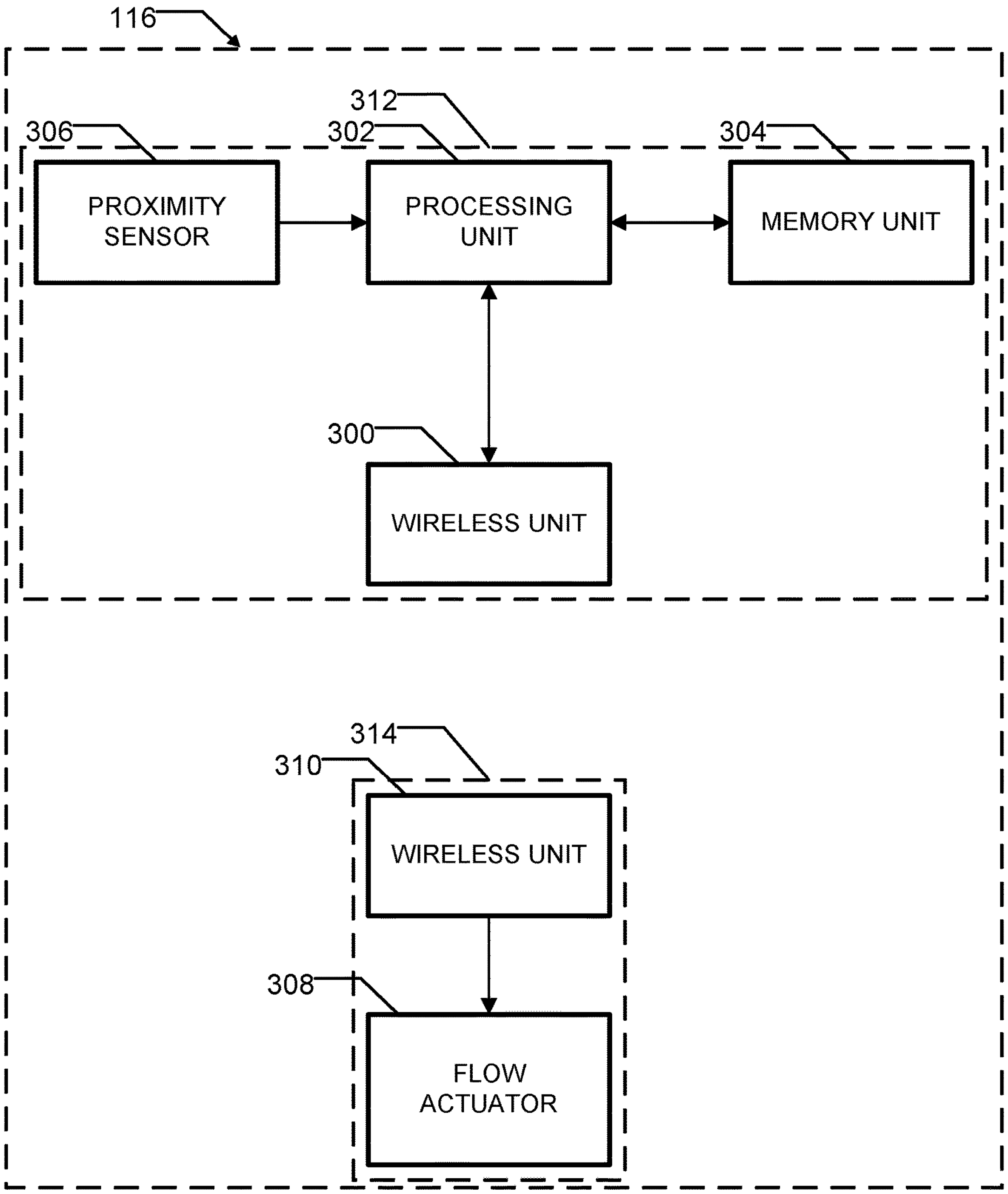
FIG. 3*b* is a block diagram which shows a second embodiment of a flow controller.

Now referring to FIG. 3*b*, there is shown another embodiment of the flow controller 116. In this embodiment, the flow controller 116 comprises two units. A first unit 312 is moveable and may be carried by an operator while a second unit 314 is mounted on the fuel delivery truck. It will be appreciated that the first unit 312 and the second unit 314 are wirelessly connected together in the embodiment disclosed in FIG. 3*b*. As a matter of fact, the second unit 314 comprises a wireless unit 310 used for that extent. In an alternative embodiment, the first unit 312 and the second unit 314 are connected together using a wired connection. In such case, the second unit 314 does not comprise the wireless unit 310.

Figure 4:
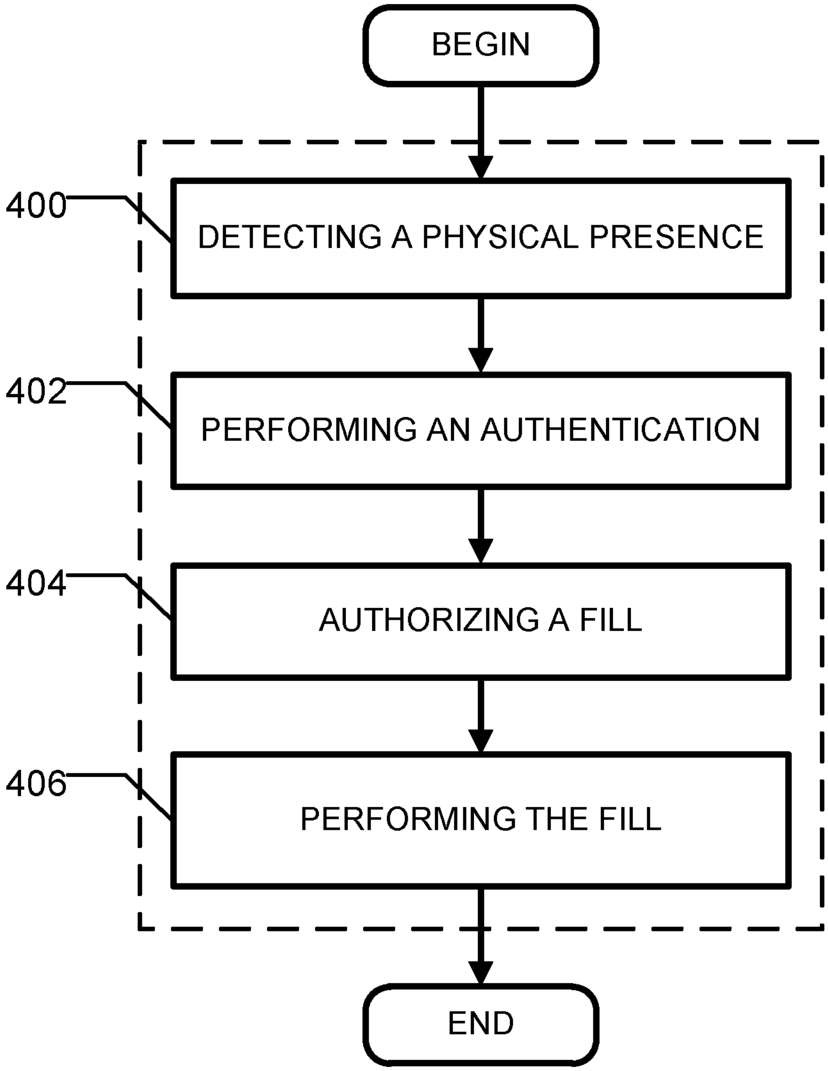
FIG. 4 is a flowchart which shows an embodiment for filling up an LPG tank in accordance with one or more embodiments of the method.

Now referring to FIG. 4, there is shown an embodiment for delivering LPG to an LPG tank in accordance with one or more embodiments of the method disclosed herein.

According to processing step 400, a physical presence is detected of a fuel delivery truck in the vicinity of an LPG tank is detected. It will be appreciated that in the embodiment of the method disclosed herein the telemetry unit 112 is mounted on the LPG tank and the fuel delivery truck is equipped with the flow controller 116.

More precisely, it will be appreciated that the physical presence is detected by at least one of the telemetry unit 112 and the flow controller 116. More precisely and in accordance with one or more embodiments, the physical presence is detected by the proximity sensor 306 of the flow controller 116 as well as the proximity sensor 206 of the telemetry unit 112. It will be appreciated by the skilled addressee that a physical presence is required for delivering LPG from the fuel delivery truck to the LPG tank.

According to processing step 402, an authentication is performed.

Figure 6A:
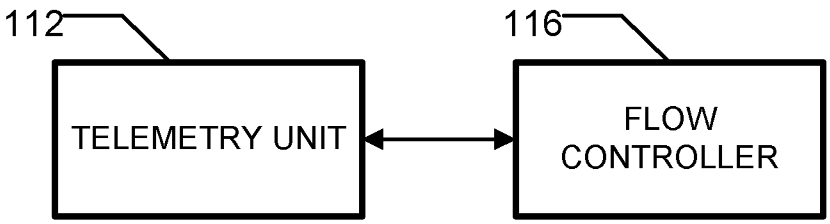

It will be appreciated that the authentication may be performed according to various embodiments. In one or more embodiments, the authentication is performed by sharing data between the telemetry unit 112 and the flow controller 116. A wireless connection between the telemetry unit 112 and the flow controller 116 is illustrated in FIG. 6*a*. It will be appreciated that the authentication may comprise exchanging data between the flow controller 116 and the telemetry unit 112.

The data may be selected from a group consisting of an identifier uniquely identifying the LPG tank, an identifier uniquely identifying the fuel delivery truck, an indication of a physical location of at least one of the LPG tank and the fuel delivery truck, an initial level of the LPG tank, an indication of a capacity of the LPG tank, an optimal filling capacity of the LPG tank, a data associated with successful without overflow previous filling operations, etc. In fact, it will be appreciated that the telemetry unit 112 may comprise data such as an indication about expected flow controller identifier, an indication to either prevent or allow any fill (i.e. white list or black list), a maximum acceptable amount of LPG to be delivered, a specific initial fill level range, a specific maximum fill value, etc. It will be appreciated that at least one part of the data may be further transmitted in one or more embodiments to the remote server. The skilled addressee will appreciate that the data may be transmitted to the remote server for audit and/or billing purposes to the remote server.

According to processing step 404, a check is performed for authorizing the fill. It will be appreciated that the check may be performed according to various embodiments. The purpose of the check is to either allow or prevent the fill of the LPG tank.

In fact, it will be appreciated that the check may be performed using at least one part of the data exchanged between the flow controller 116 and the telemetry unit 112.

It will also be appreciated that in one or more embodiments, the remote server is also involved for performing the check. It will be also appreciated that in one or more embodiments, the user of the LPG tank may be involved. For instance and in accordance with one embodiment, the user could be reached in real-time using his smartphone and be requested to authorize the fill.

As explained, it will be appreciated that the purpose of the check is to ensure that the fill of the LPG tank is allowed or not. As a matter of fact, the skilled addressee will appreciate that in certain conditions the LPG tank should be prevented from being filled. For instance, it will be appreciated by the skilled addressee that it may be pertinent to prevent the tank from being filled in the case where the LPG tank has been decommissioned. In another embodiment, it might be pertinent to prevent the tank from being filled in the case where the LPG tank is damaged. Another condition could be that the LPG tank needs a recertification or a check. Another condition could be that that there is no order in the system. Another condition could be that the operator is trying to feed a wrong tank. Another condition is that there is no scheduled delivery on that day. Another condition is that an initial tank level is too high or too low. Another condition is that a corresponding consumption is abnormal (e.g. too important). Another condition is that an inactivity has been detected for too long. As a matter of fact, it will be appreciated that a condition may be that at least one specific value is outside a given range. While it will be appreciated that the conditions may be in one embodiment associated with the tank per se, it will be appreciated that the conditions may be also associated with the user of the LPG tank. For instance, a user may be prevented to have its LPG tank filled up if his/her account is delinquent.

In the case wherein the fill is authorized and according to processing step 406, the fill of the LPG tank is performed. It will be appreciated that the fill may be performed according to various embodiments.

While it has not been mentioned in FIG. 4 that the fuel delivery truck is operatively connected to the LPG tank, it will be appreciated by the skilled addressee that this step, performed by an operator, may be performed according to various embodiments. For instance in one or more embodiments, such connecting may be performed during processing step 400. It will be appreciated that in one or more embodiments, the connecting may be performed at a later stage.

Figure 5:
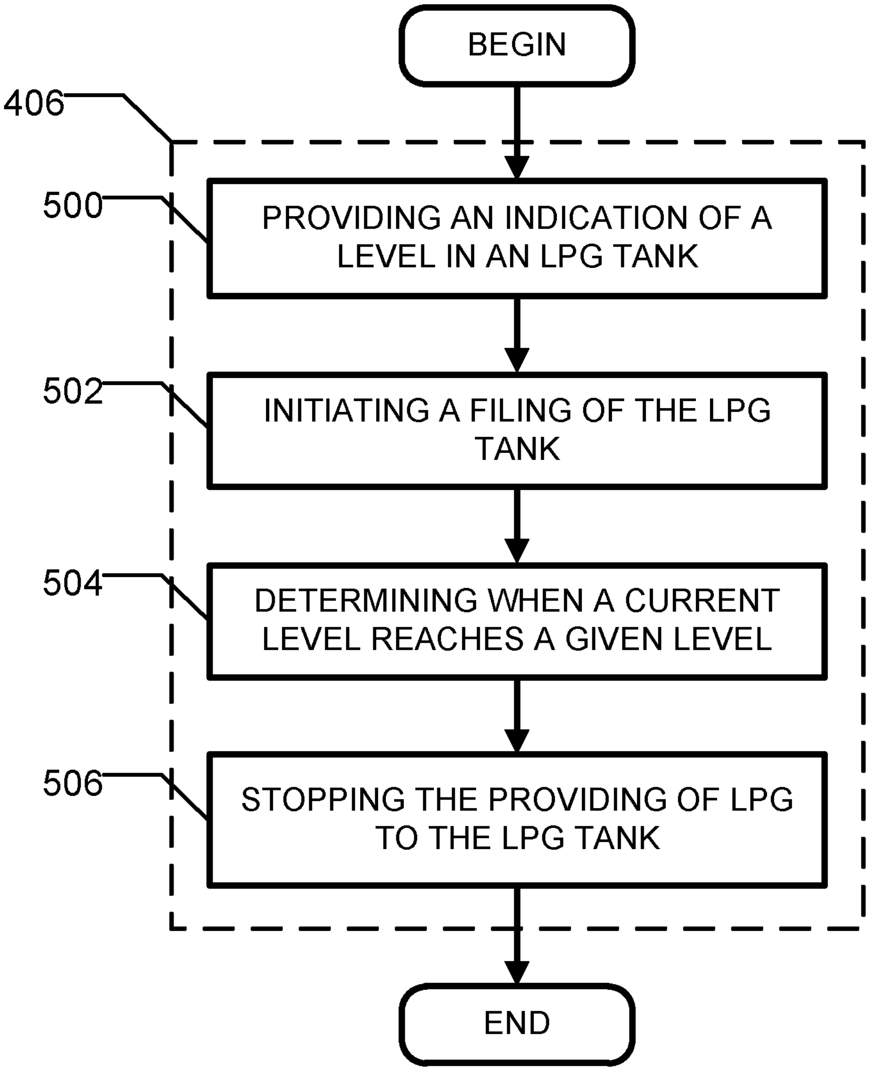
FIG. 5 is a flowchart which shows an embodiment for initiating the fill of the LPG tank with one embodiment of the system as disclosed herein.

Now referring to FIG. 5, there is shown an embodiment for performing the fill of the LPG tank.

It will be appreciated that the fill of the LPG tank is performed with the objective to avoid a spill of LPG in the environment.

According to processing step 500, an indication of a level of the LPG tank is provided. It will be appreciated that the indication of the level of the LPG tank is provided, in one or more embodiment, by the tank level measuring unit 208 of the telemetry unit 112. Such data is then provided via the processing unit 202 of the wireless unit 200 to the flow controller 116.

According to processing step 502, a filing of the LPG tank is initiated. It will be appreciated that the filling of the LPG tank is initiated upon receipt of a signal by the flow actuator 308.

The sending of the signal to the flow actuator 308 may be performed by the processing unit 302 upon checking that various conditions are met. It will be appreciated by the skilled addressee that the various conditions may be of various types. For instance, it will be further appreciated that that the filing of the LPG tank is initiated once the filling hose is connected to the fill assembly of the LPG tank.

According to processing step 504, a check is performed as to when a current level in the LPG tank reaches a given level. It will be appreciated that this is performed using the telemetry unit 112, and more precisely using the tank level measuring unit 208. In one or more embodiments, a current level in the LPG tank 210 is read every one second. In one or more another embodiments, a signal is received once the current level in the LPG tank reaches a given level.

In fact, it will be appreciated that in one or more embodiments the comparison is performed between a measured level and a maximum level to fill the LPG tank. It will be appreciated that that the comparison may be customized, self-learned, specific per tank level and also known locally in the telemetry unit 112 thus not requiring connection to the remote server for a fill.

Figure 6B:
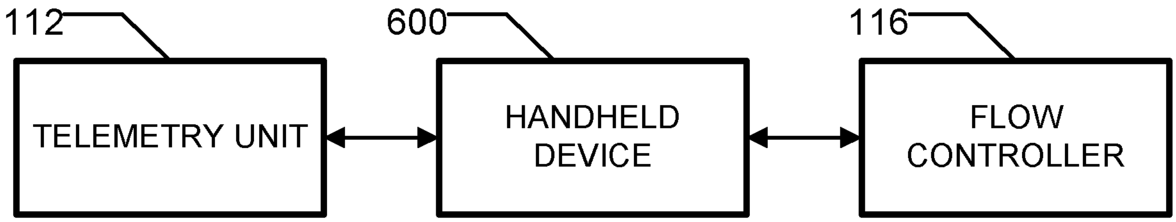
FIG. 6*b* is a block diagram which illustrates a wireless connected between a flow controller and a telemetry unit which is achieved via a handheld device.

While in one or more embodiments, the LPG is provided to the LPG tank 210 at a constant flowrate, it will be appreciated by the skilled addressee that such flowrate (or filling rate) may be modified by the flow actuator 308 over time. This may be possible provided the flow actuator 308 is capable of controlling an LPG flowrate. For instance and in such case, the flow actuator 308 may provide a flowrate greater at the beginning of the fill and may then amend the flowrate over time to provide a reduced flowrate to avoid that a maximum level of LPG in the LPG tank 210 is exceeded. The skilled addressee will appreciate that this will enable the providing of a precise fill. In one or more embodiments, the flowrate is amended once a current level reaches a predefined level. It will be appreciated that in one or more embodiments, the flowrate is amended by selecting from a range of desired LPG tank sizes or max GPM on a handheld device operatively connected to the flow controller 16. The handheld device, not shown in FIG. 1, may be of various types and may be operated by the operator operating the delivery truck as mentioned above. As a matter of fact, the handheld device may operate according to various embodiments. In one or more embodiments, the handheld device is operatively connected using a wireless connection to the flow controller 116. In one or more embodiments, shown for instance in FIG. 6*b*, an handheld device 600 is operatively connected using a wireless connection to the flow controller 116 as well as to the telemetry unit 112. In such embodiments, the wireless connection between the flow controller 116 and the telemetry unit 112 is achieved via the handheld device 600.

According to processing step 506, the providing of the LPG to the LPG tank 210 is stopped. It will be appreciated that the stopping of the providing of the LPG to the LPG tank 210 is performed to ensure that a given level is not reached.

It will be appreciated that this may be performed using the telemetry unit 112 interacting with the flow controller 116. More precisely, the processing unit 302 of the flow controller 116 may provide a stop signal to the flow actuator 308 resulting in a stopping of the providing of the LPG to the LPG tank 210 in response to data obtained by the telemetry unit 112. It will be appreciated by the skilled addressee that this may be performed according to various embodiments. It will be appreciated that in one or more embodiments, the stop signal is generated by the telemetry unit 112 interacting with the flow controller 116. In such embodiment, the stop signal is transmitted to the flow controller 116 and in particular to the flow actuator 308 of the flow controller 116.

In fact, the given level not to be reached may be determined according to various embodiments.

It will be also appreciated that the given level may be of various types.

In one or more embodiments, the given level is fixed and is associated with the LPG tank. It is an optimal maximum fill level.

In one or more embodiments, the given level of the LPG tank is determined using data associated with at least one previous fill. For instance, the determining may take into account the minimum level and/or other fill levels along with feedback coming from at least one of an optional overfill sensor and an operator operating the fuel delivery truck.

In one or more other embodiments, the providing of the LPG to the LPG tank 210 may be stopped by the operator overriding the system using a processing device, such as an handheld device, operatively connected to the flow controller 116.

In fact, in one or more embodiments, the operator of the fuel delivery truck may, using the handheld device operatively connected to the flow controller 116, provide a feedback indicative that the fill of the LPG tank 210 has been successful, i.e. without any spill of LPG due to an overfill. The skilled addressee will appreciate that such feedback may be pertinent, for instance, for the auditing for environmental purposes, for the monitoring of the flow controller 116, for the monitoring of the telemetry unit 112. It will be also appreciated that such feedback may be used to confirm that the fill was a success.

There is also disclosed a system for filling an LPG tank equipped with a spit valve and a fill assembly, the system comprising a telemetry unit to be installed on an LPG tank, the telemetry unit comprising: a tank level measuring unit for providing an indication of a corresponding tank level of the LPG tank; a proximity sensor for detecting a presence of a corresponding given flow controller in a vicinity of the telemetry unit; a telemetry unit communication unit for communicating with a corresponding given flow controller communicating unit when said given flow controller is in vicinity of the telemetry unit; a memory unit for storing data; and a processing unit operatively connected to the tank level measuring unit, the proximity sensor, the telemetry unit communication unit, and the memory unit. The system further comprises a flow controller installed at a corresponding fuel delivery truck, the flow controller comprising: a proximity sensor for detecting a presence of a corresponding given telemetry unit; a flow actuator for controlling a flow of LPG provided; a flow controller communication unit for communicating with the corresponding given telemetry unit when said corresponding given telemetry unit is in vicinity of the flow controller; a memory unit for storing data; and a processing unit operatively connected to the proximity sensor, to the flow actuator, to the memory, and to the flow controller communication unit. The filling of the LPG tank comprises: obtaining an indication of a level in the LPG tank upon detection of a filling vehicle in a vicinity of the LPG tank using the tank level measuring unit of the telemetry unit, the filling vehicle having a filling hose; initiating a filling of the LPG tank once the filling hose is connected to the fill assembly of the LPG tank using the flow actuator of the flow controller; determining when a current level measured by the tank level measuring unit reaches a given level in the LPG tank using the tank level measuring unit of the telemetry unit; and stopping the providing of the LPG to the LPG tank using the flow actuator of the flow controller once the current level reaches the given level in the LPG tank.

In one or more embodiments, the flow controller is operatively connected to the telemetry unit using one of a wired and a wireless connection.

In one or more embodiments, the system further comprises a remote server operatively connected to the telemetry unit and to the flow controller.

One or more embodiments of the method and the system disclosed herein are of great advantage.

A first advantage of one or more embodiments of the method and the system disclosed above is that they prevent accidental or intentional overfilling of the recipient.

Another advantage of one or more embodiments of the method and the system disclosed above is that they prevent accidental or intentional spilling or venting of harmful liquids and emissions external to the recipient.

Although the above description relates to a specific preferred embodiment as presently contemplated by the inventor, it will be understood that one or more embodiments of the invention in its broad aspect include functional equivalents of the elements described herein.

The invention claimed is:

1. A method for filling an LPG tank equipped with a spit valve and a fill assembly, the method comprising:

detecting a filling vehicle in a vicinity of the LPG tank;

providing an indication of a level in the LPG tank upon the detecting of the filling vehicle in the vicinity of the LPG tank, the filling vehicle having a filling hose;

connecting the filling hose to the fill assembly of the LPG tank;

initiating a filling of the LPG tank upon the connecting of the filling hose to the fill assembly of the LPG tank;

determining when a current level reaches a given level in the LPG tank; and stopping the filling of the LPG to the LPG tank once the current level reaches the given level in the LPG tank.

2. The method as claimed in claim 1, further wherein a telemetry unit is operatively connected to the LPG tank; further wherein the indication of the level in the LPG tank is provided upon detection of a filling vehicle in a vicinity of the LPG tank using the telemetry unit.

3. The method as claimed in claim 2, further wherein the filling vehicle is provided with a flow controller; further wherein the initiating of a filling of the LPG tank once the filling hose is connected to the fill assembly of the LPG tank and the stopping of the filling of the LPG to the LPG tank are performed using the flow controller.

4. The method as claimed in claim 3, further wherein the flow controller is operatively connected to the telemetry unit; further comprising performing an authentication between the telemetry unit and the flow controller.

5. The method as claimed in claim 4, wherein the authentication comprises sharing data between the telemetry unit and the flow controller.

6. The method as claimed in claim 5, wherein the shared data is selected from a group consisting of an identifier uniquely identifying the LPG tank, an identifier uniquely identifying the filling vehicle, an initial level of the LPG tank, an indication of a capacity of said LPG tank, an optimal filling capacity of the LPG tank, data associated with successful without overflow filling operations.

7. The method as claimed in claim 5, wherein the authentication further comprises sharing data between a remote server and at least one of the telemetry unit and the flow controller.

8. The method as claimed in claim 3, further comprising obtaining a feedback indicative of a successful fill from an operator interacting with the flow controller via a processing unit.

9. The method as claimed in claim 3, wherein the given level is associated with the LPG tank.

10. The method as claimed in claim 3, further comprising determining the given level of the LPG tank.

11. The method as claimed in claim 10, wherein the given level of the LPG tank is determined using data associated with at least one previous successful fill.

12. The method as claimed in claim 3, wherein the flow controller is capable of controlling an LPG flowrate; further wherein the initiating of the filling of the LPG tank comprises providing the LPG at a given LPG flowrate and amending the LPG flowrate.

13. The method as claimed in claim 12, wherein the LPG flowrate is amended once the current level reaches a predefined level.

14. The method as claimed in claim 3, further comprising stopping the fill upon detection of an input of an operator of the filling vehicle.

* * * * *